United States Patent Office 3,432,473
Patented Mar. 11, 1969

3,432,473
PROCESS FOR THE PRODUCTION OF ALIPHATIC OR CYCLOALIPHATIC POLYESTERS OF CARBONIC ACID
Wolfgang Seeliger, Marl, Germany, assignor to Chemische Werke Huls Aktiengesellschaft, Marl, Germany, a corporation of Germany
No Drawing. Filed May 10, 1965, Ser. No. 454,667
Claims priority, application Germany, May 14, 1964, C 32,892
U.S. Cl. 260—77.5    5 Claims
Int. Cl. C08g 17/13; C07c 69/00

ABSTRACT OF THE DISCLOSURE

A method of producing high molecular weight rubber-like polyesters of carbonic acid by reacting aliphatic or cycloaliphatic diols containing 4 to 40 carbon atoms or glycols with 2 to 20 alkoxy groups, each group containing 2 to 40 carbon atoms, with phosgene in the presence of a chlorformic acid ester of a monovalent aliphatic alcohol containing 1 to 4 carbon atoms to form a precondensate having the formula HO—R—(O—CO—OR)$_x$—O—CO—OR' removing the volatile constituents, and then continuing the condensation, preferably in the presence of an alkaline catalyst, to form the polycondensate.

---

The present invention relates to the production of high molecular weight polyesters of carbonic acid. More particularly, it relates to the production of high molecular weight polyesters of carbonic acid by reacting aliphatic or cycloaliphatic diols or polyalkylene glycols with phosgene in the presence of a chlorformic acid ester of a monovalent aliphatic alcohol containing one to four carbon atoms.

The production of thermoplastic polycarbonates by the reaction of aliphatic or cycloaliphatic glycols with phosgene has previously been described.

It has also previously been disclosed that high molecular polyesters of carbonic acid can be prepared by reacting diols containing from 4 to 40 carbon atoms with chlorformic acid esters of monovalent aliphatic alcohols having from 1 to 4 carbon atoms. The products of neither of the above processes have, however, been found suitable for certain purposes where low chlorine content and good mechanical properties are required to make them particularly suitable for the production of fibers, films, coatings, and the like.

It has now been discovered that by the process of the present invention high molecular weight polyesters of carbonic acid having the improved properties referred to above can be produced by reacting one mole of an aliphatic or cycloaliphatic diol containing from 4 to 40 carbon atoms, or a polyalkylene glycol containing from 2 to 20 alkoxy groups, each alkoxy group containing from 2 to 4 carbon atoms, with 0.5 to 1.5 moles of phosgene, in the presence of 0.1 to 0.9, and preferably 0.2 to 0.7 mole, of chlorformic acid ester of a monovalent aliphatic alcohol containing 1 to 4 carbon atoms, and where the sum of the number of moles of phosgene and chlorformic acid ester used is between 1.0 and 1.6, and the resulting precondensate has the following general formula:

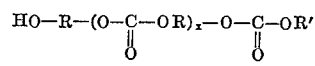

after removal of the volatile constituents at temperatures ranging from 100° to 300° C., catalysts being used if necessary for the polycondensation. In the above formula, R represents an aliphatic or cycloaliphatic group containing 4 to 40 carbon atoms, or an oxaliphatic group represented by the formula —O—CH$_2$—CHR, wherein R represents H or an aliphatic radical such as —CH$_3$ or —CH$_2$, —CH$_3$; R' represents an alkyl group containing 1 to 4 carbon atoms, and X represents an integer between 1 and 30.

Diols suitable for use in the present invention include aliphatic diols such as butane-diol-1,4, hexane-diol-1,6, decane-diol-1,10, and preferably cycloaliphatic residues containing diols such as cyclohexane-diol-1,3, cyclohexane-diol-1,4, dimethylolcyclohexane-1,3, dimethylolcyclohexane-1,4, and the polyalkylene glycols such as di-, tri-, tetra-, penta-, hexa-, and poly-ethylene and poly-propylene glycols. Other homologs may likewise be used.

The chlorformic acid esters suitable for use in the process include the methyl, ethyl, propyl and butyl esters of chlorformic acid. They can be readily produced by reacting phosgene with aliphatic alcohols containing 1 to 4 carbon atoms at temperatures below approximately 50° C. The reaction mixture thus obtained can, if desired, be reacted directly with the diols, without further purification.

If desired, the chlorformic acid esters can be produced in situ by reacting a mixture of 1 mole of the particular diol with 1.0 to 1.6 moles, of phosgene, and with 0.1 to 0.9 mole, and preferably, with 0.2 to 0.7 mole of an aliphatic alcohol containing 1 to 4 carbon atoms. The resulting chlorformic acid ester is then in turn reacted with the cycloaliphatic diol or polyalkylene glycol and additional phosgene to give the desired high molecular weight polyester of carbonic acid.

The mechanism of the reaction is believed to be represented by the following equation:

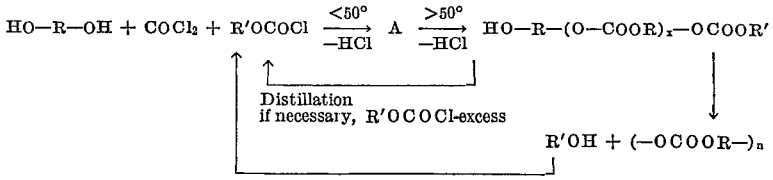

In the above equation R represents an aliphatic or cycloaliphatic group containing 4 to 40 carbon atoms, or an oxaliphatic group; R' is an alkyl group containing 1 to 4 carbon atoms and $x$ is an integer between 1 and 30.

From the above equation and general description it will be seen that below 50° C. a mixture A, comprising the chlorformic acid ester of the monovalent alcohol, diol-monochlorformic acid ester, HCl gas, possibly some unreacted diol, as well as small amounts of diol-bischlorformic acid ester, is formed. Upon heating to temperatures above 50° C. a reaction between the remaining hydroxyl groups and the chlorformic acid ester groups begins, and the remaining chlorformic acid ester groups, if any, can be removed by distillation. Small amounts of the monovalent aliphatic alcohol can then be added and then there will first be formed preliminary products of the type indicated by the formula:

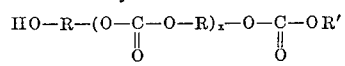

which are surprisingly characterized by a small chlorine content and which can be polymerized to high molecular weight plastics with good mechanical properties.

The process of the present invention can be operated either batchwise or continuously. When carried out in a continuous manner the phosgene consumption is usually only slightly above 1 mole per mole of diol. When carried out batchwise, however, additional phosgene, e.g. up to 1.6 moles per mole of diol, is required, since the chlorformic acid ester, R'OCOCl, which will eventually be present in excess is first formed. By repeated operation of the process the phosgene consumption will, however, approach the value of 1 mole per mole of diol, provided the distillates indicated in the above reaction scheme are returned again to the initial mixture. Where large amounts of the chlorformic acid ester, R'OCOCl, are returned to the reaction mixture, or are introduced thereto, the phosgene consumption can fall below 1 mole per 1 mole of diol.

In some cases, when producing the high molecular weight polyesters of carbonic acid of the present invention it has been found advisable to use very small amounts of catalysts to speed up the operations. Catalysts which have been found suitable for this purpose include the alcoholates, hydrides, or oxides of the alkali and alkaline earth metals, such as lithium, sodium, potassium, calcium, or magnesium, as well as other alkaline materials such as zinc oxide, titanium alkoxide, or mixtures thereof. They are conveniently added in solution or suspension form. At the conclusion of the reaction, the catalysts can be removed or neutralized by known methods.

The high molecular weight polyesters of carbonic acid produced in accordance with the present invention have been found to be useful for various purposes, as for example, as casting resins, in the production of fibers, films or coatings, or as adhesives, the particular use depending upon the consistency and molecular weight of the product and the particular starting materials. In comparison with the polycondensates obtained by direct reaction of glycols with phosgene, they exhibit decidedly improved mechanical properties without the presence of any chlorine-containing chain-breaking by-products.

The specific examples which follow are cited for the purpose of illustrating the invention disclosed herein. Various modifications of the specific procedures set forth will be obvious to one skilled in the art. It is understood, however, that any such modification which does not depart from the basic concept of the invention disclosed herein is intended to be included in the appended claims.

Example 1

288 parts by weight (2 moles) of pure 1,4-dimethylol cyclohexane (ca. 50% trans, 50% cis) were mixed with 43.5 parts by weight of chlorformic acid ethylester (0.2 mole/mole diol) and dissolved by warming, and then cooled to 10° C. While at the latter temperature 180 parts by weight of phosgene (1.8 moles) were introduced into the mixture while stirring, no gas being wasted.

The mixture was then allowed to stand over night, a current of dry nitrogen passed through it at room temperature for a period of two hours, and the mixture then heated to 50° C. for one hour. During the latter operation the dissolved HCl was liberated and obtained in practically anhydrous condition. After approximately one hour at 50° C., the mixture was heated for a period of three hours at 120° C. under a reflux condenser whereby additional large quantities of HCl were liberated. The mixture was then cooled to approximately 70° C. and 18 parts by weight of ethanol added. The reflux condenser was then removed and the reaction mixture heated again to 120° C. After passage of a current of dry nitrogen gas through the mixture for a period of approximately one hour, the mixture was held under the vacuum of a water aspirator for two hours at a temperature of 120° C. The residue consisted of 345 parts by weight of precondensate having a chlorine content of 0.16%.

60 parts by weight of the above precondensate were mixed with 0.06 part by weight of sodium methylate catalyst and then subjected to polycondensation by heating under normal pressure (1 hour at 200 to 220° C. and 1 hour at 220 to 240° C.) and then under the vacuum of an oil pump (1 hour at 200 to 220°, 0.5 hour at 220 to 240° C., 0.5 hour at 240 to 250° C., 1 hour at 250° to 255° C. and 0.5 hour at 255 to 260° C.) each time while being flushed with a current of dry nitrogen gas introduced through a capillary boiling tube. The reduced viscosity of the final product was determined in a 1% solution in chloroform at 20° C. and found to be 0.37. The yield amounted to 93% of the theoretical.

Examples 2a—2c

In these experiments the operation was carried out as described in Example 1 above, using 288 parts by weight (2 moles) of 1,4-dimethylol cyclohexane. In these experiments, the indicated amounts of technically absolute alcohol were added instead of the chlorformic acid ethyl ester used in Example 1. The mixture was then heated to bring the material into solution and after being cooled to 10° C. was flushed with 240 parts by weight (2.4 moles) of phosgene. The details of these experiments are shown in the table which follows:

TABLE

| Example No. | Initial ethanol | | Precondensate | | | Polymer | | |
|---|---|---|---|---|---|---|---|---|
| | Pts. by wt. | Added moles/mole of diol | Parts by wt. | Cl, percent | | Pts. by wt. from 60 g. precondensate | Yield | ηRed |
| 2a | 61.5 | 0.67 | 358 | 0.07 | | 53.0 | 92 | 0.30 |
| 2b | 47.0 | 0.50 | 360 | 0.11 | | 55.2 | 97 | 0.80 |
| 2c | 33.0 | 0.35 | 356 | 0.30 | | 55.7 | 97 | 0.63 |

Example 3

1440 parts by weight of cyclohexane-dimethanol (64% cis) (10 moles), 184 parts by weight ethanol (4 moles) and 1200 parts by weight of phosgene (12 moles) were precondensed as described in Example 2. The precondensate after being flushed with nitrogen contained 0.25% Cl. The yield amounted to 1835 parts by weight.

60 parts by weight of the above precondensate were flushed with dry nitrogen gas for a period of 1 hour at 200 to 220° C., 1 hour at 220 to 240° C. under normal pressure and then for 1 hour at 220 to 240° C. under the vacuum of an oil pump, cooled to 80° C., and then stirred with a solution of 0.01 part by weight of sodium in 0.8 part by weight of methanol. After 1 hour at 200 to 220° C./1 mm. Hg. and 0.5 hour at 220 to 230° C./1 mm. Hg., 54 parts by weight (97% of the theoretical) of polycarbonate having a reduced viscosity of 0.75 was obtained.

Example 4

120 parts by weight (0.226 mole) of the diol $C_{36}H_{68}O_2$ (produced as described in J. Am. Chem. Soc. 66 (1944), 84 (Note 14a) and 68), 9 parts by weight of ethanol and 33 parts by weight of phosgene (0.33 mole) were precondensed and then polycondensed as described in Example 1. In this manner 128 parts by weight of a rubber-like elastic substantially insoluble polycarbonate were obtained.

What is claimed is:

1. A process for the production of high molecular weight polyesters of carbonic acid which comprises first precondensing 1 mole of a diol selected from the group consisting of aliphatic and cycloaliphatic diols containing 4 to 40 carbon atoms and polyalkylene glycols containing 2 to 20 alkoxy groups, each said alkoxy group containing 2 to 4 carbon atoms, with 0.5 to 1.5 moles of phosgene, in the presence of 0.1 to 0.9 mole of a chloroformic acid ester of a monovalent aliphatic alcohol containing 1 to 4 carbon atoms, and where the sum of the number of moles of phosgene and of chlorformic acid ester is between 1.0 and 1.6, removing at a temperature between 100 and 300° C. the volatile reaction products of said reaction, and then polycondensing the precondensed reaction product having the formula

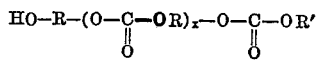

where R is selected from the group consisting of aliphatic and cycloaliphatic groups containing 4 to 40 carbon atoms, and oxaliphatic groups, R' represents alkyl groups containing 1 to 4 carbon atoms, and x represents an integer between 1 and 30, to produce the polycarbonate ester.

2. The process of claim 1, wherein the chlorformic acid ester of a monovalent aliphatic alcohol is produced in situ.

3. The process of claim 1, wherein the polycondensation is effected in the presence of an alkaline catalyst.

4. The process of claim 1, wherein the polycondensation is effected in the presence of an alkaline catalyst selected from the group consisting of alkali and alkaline earth alcoholates, hydrides and oxides, zinc oxide, and titanium alkoxide.

5. The process of claim 1, wherein the precondensate is substantially freed from chlorine by treatment at 100–300° C. with a monovalent aliphatic alcohol.

References Cited

UNITED STATES PATENTS

| | | | |
|---|---|---|---|
| 3,022,272 | 2/1962 | Schnell et al. | 260—77.5 |
| 3,177,179 | 4/1965 | Lee et al. | 260—77.5 |
| 3,245,963 | 4/1966 | Schramm et al. | 260—77.5 |
| 3,301,824 | 1/1967 | Hostettler et al. | 260—77.5 |
| 3,313,777 | 4/1967 | Elam et al. | 260—77.5 |
| 3,359,242 | 12/1967 | Seeliger | 260—77.5 |

FOREIGN PATENTS 925,139  5/1963  Great Britain.

OTHER REFERENCES

Sarel et al.: "Journal Organic Chemistry," vol. 24, December 1959, pp. 1873–8.

SAMUEL H. BLECH, *Primary Examiner.*

U.S. Cl. X.R.

260—463